United States Patent [19]

Kline et al.

[11] Patent Number: 4,938,542
[45] Date of Patent: Jul. 3, 1990

[54] BRAKING SYSTEM AND BREAK-AWAY BRAKING SYSTEM

[76] Inventors: Wayne K. Kline, R.D. 1, Box 340, Turbotville, Pa. 17772; Jan J. Homan, R.D. 2, Box 138, Watsontown, Pa. 17777

[21] Appl. No.: 306,989

[22] Filed: Feb. 6, 1989

[51] Int. Cl.$^5$ ............................................. B60T 13/66
[52] U.S. Cl. ......................................... 303/20; 188/158
[58] Field of Search ...................... 303/20, 7; 188/158, 188/159, 160, 161, 163, 112 R, 112 A

[56] References Cited

U.S. PATENT DOCUMENTS

| | | | |
|---|---|---|---|
| Re. 30,550 | 3/1981 | Reise | 188/112 A |
| 2,867,294 | 1/1959 | Sturdivant | 188/159 |
| 4,052,695 | 10/1977 | Myers | 303/20 X |
| 4,524,311 | 6/1985 | Yokota et al. | 303/20 |

FOREIGN PATENT DOCUMENTS 1016480  8/1977  Canada .............................. 188/112 R Primary Examiner—Douglas C. Butler
Assistant Examiner—Matthew C. Graham
Attorney, Agent, or Firm—Reed Smith Shaw & McClay

[57] ABSTRACT

The present invention provides an electric braking system and an electric break-away braking system which provide sufficient power, i.e. both current and voltage, to all the electric brakes of a truck or trailer to fully activate them when braking is required. Both braking systems of the present invention utilize two voltage sources which are normally connected in parallel for charging. When braking is required, however, the electronic control circuitry switches the voltage sources from a parallel configuration into a series configuration to provide a sufficient voltage to overcome the resistance losses in the brake lines and thereby provides enough voltage at the electric trailer brakes to have them provide the maximum possible braking.

15 Claims, 2 Drawing Sheets

BRAKING SYSTEM AND BREAK-AWAY BRAKING SYSTEM

FIELD OF THE INVENTION

The present invention relates to a braking system and a break-away braking system used on large vehicles, and more particularly trucks and trailers which use electric brakes.

BACKGROUND OF THE INVENTION

Braking systems have been used for many years on large vehicles such as trucks, trailers and the like. Similarly, break-away braking systems have been used for many years on towed vehicles and trailers to help stop them if they become separated from the truck cab or towing vehicle. U.S. Pat. No. 4,072,362 describes an hydraulic braking system for towing vehicle and trailer combinations. Similarly, electric braking systems have been used as shown by the electric brake controller in U.S. Pat. No. 4,721,344. Other electrical control systems for electric and hydraulic brakes are shown in U.S. Pat. Nos. 4,033,630 and 4,524,311. These systems actually combine an electrical control system with either a hydraulic braking system or an electric braking system.

Various other brake control systems such as that shown in U.S. Pat. No. 3,840,276 have been used which activate the brakes to correct for swaying in the trailer. Similarly, RE 30,550 shows such an electronic brake control circuit having a truck battery and a trailer battery which are connected in parallel.

Break-away braking systems have also been used for years as shown in U.S. Pat. Nos. 3,907,071 and 4,052,695. These systems typically have an auxiliary battery mounted on the trailer which activates the electric brakes when the trailer breaks-away or becomes separated from the truck cab. U.S. Pat. No. 3,681,551 describes a disconnect safety switch used in a break-away braking system.

Today's electric braking systems, however, suffer from a common problem in that not enough power is supplied by the control system to the electric brakes to obtain the maximum possible braking during an emergency stop. Not only must a certain amount of current be provided to the brakes but it must be provided at the proper voltage to enable the electric brakes to provide their maximum braking. Too often in emergency situations, the voltage provided to the electric brakes is insufficient to obtain maximum braking due to the resistance in the brake lines or cables.

Present braking systems often utilize standard 12-volt batteries which are also used to provide power to the other electrical components on the truck. Connecting several of these 12-volt batteries in parallel results in a power source which provides sufficient current to the electric brakes, but which is unable to provide that current at a sufficient voltage due to resistance in the brake lines from the batteries to the electric brakes. Connecting these 12-volt batteries in series would increase the voltage, but has the disadvantage that the resulting higher voltage would damage the other electrical systems of the truck which use the same batteries as a power source and which are not designed to operate using a higher voltage. However, without an increase in voltage to the electric brakes, they will be under-powered and will not provide the maximum possible braking.

A similar problem exists with today's break-away braking systems. While many of these systems use a standby auxiliary battery on the trailer which activates the trailer's electric brakes in a break-away condition and thereby slows down and stops the runaway trailer. Typically, the batteries used in break-away braking systems are 12-volts and suffer the same loss in voltage delivered to the electric brakes due to the resistance in the brake lines that the present braking systems do.

It would be desirable therefore if there was a braking system and a break-away braking system which could overcome the problems discussed above and provide the maximum braking capacity of the brakes when needed such as during an emergency stop.

SUMMARY OF THE INVENTION

The present invention relates to a brake control system and a separate break-away brake control system, both of which can be utilized on a truck, trailer or other vehicle to provide maximum braking from an electric braking system. The braking systems of the present invention provide a voltage source that delivers a sufficient voltage to the electric brakes to obtain maximum braking regardless of the losses due to the resistance in the brake lines or cables.

The electric brake control system of the present invention comprises two voltage sources which are normally connected in parallel. Preferably, one of these voltage sources is the truck battery (or a bank of batteries) which supplies power to the other electrical systems in the truck and the second is an auxiliary battery used to provide the additional voltage required to fully activate the electric braking system. When the voltage sources are in the parallel connection, the truck battery is used to charge the auxiliary battery to maintain the latter in a state of readiness. When the truck's braking system is activated by the driver, an electric circuit switches the truck battery and the auxiliary battery from the parallel connection into a series connection and then connects this newly-formed power source to the truck's electric brakes through the brake lines. The resulting series configuration of the truck battery and the auxiliary battery provides a sufficient voltage to overcome any resistance loss in the long brake cables lines are used to connect the batteries to the electric brakes. Preferably, the truck battery and the auxiliary battery are both standard 12-volt batteries which are commonly available. The batteries, however, could have various different voltages as long as their combined series voltage was sufficient to overcome the losses due to the resistance in the brake lines and provide a sufficient voltage at the electric brakes of the trailer to provide for the maximum braking. Typically, the electric brakes require 12 volts at the brakes themselves which means that the combined voltage of the two voltage sources should be greater than 15 volts and preferably greater than 18 volts in order to overcome the resistance losses in the brake lines.

The break-away braking system of the present invention comprises two voltage sources, typically two batteries, both of which are located on the trailer. This safety system is designed to provide a sufficient voltage to activate the trailer brakes if the trailer should accidentally become separated from the cab of the truck. If a break-away occurs, the truck battery which is normally used to activate the trailer brakes cannot be used. The break-away system of the present invention has three modes of operation: (1) charging, (2) standby, and (3) braking. In the charging mode, an electronic circuit connects the two voltage sources in parallel with each other and these in turn are connected in parallel with the truck battery. In this configuration, the truck battery provides a charging current which keeps the two voltage sources on the trailer fully charged and ready for use. When the truck is ready to set out on a trip, the electronic circuit is switched from the charging mode to the standby mode. In the standby configuration, the truck battery is disconnected from the two voltage sources in the break-away braking system and the two voltage sources are placed in a series configuration with each other. The electronic circuit, however, keeps the two voltage sources from actually being connected with each other through a break-away switch. The third mode of operation occurs when the trailer becomes separated from the cab during a break-away. When this happens, the break-away switch is activated thereby connecting the two voltage sources together in series and allowing them to provide the required current and voltage to the electric brakes on the trailer. Since the two voltage sources are both located on the trailer, a sufficient voltage and current can be applied at the electric brakes to activate them and provide the maximum possible braking. As with the braking system described above, the two batteries are preferably 12-volt batteries, but other batteries can be used so long as their combined voltage overcomes the resistance losses in the brake lines. Typically, this requires a combined voltage of more than 15 volts and preferably more than 18 volts.

Other details, objects and advantages of the present invention will become more readily apparent from the following description of a presently preferred embodiment thereof.

BRIEF DESCRIPTION OF THE DRAWINGS

In the accompanying drawings, a preferred embodiment of the present invention is illustrated by way of example only, wherein.

DESCRIPTION OF THE PREFERRED EMBODIMENT

Figure 1:
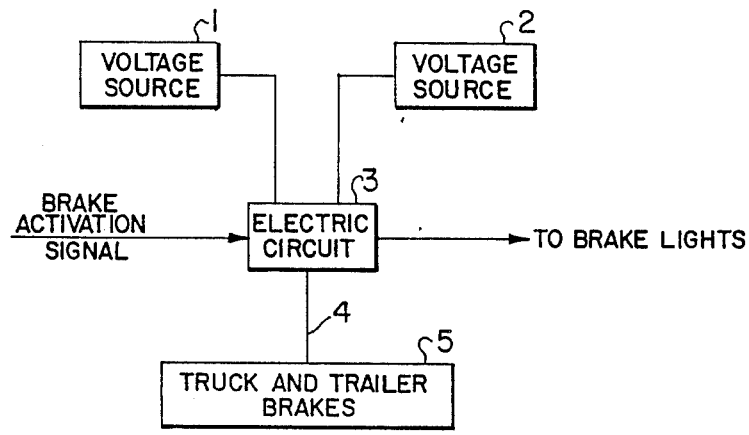
FIG. 1 is a block diagram of the braking system of the present invention.

Generally, the present invention provides an improved electric braking system and an improved electric break-away braking system for use in trucks, trailers and other towed vehicles. Preferably, as shown in FIG. 1, the present invention uses two separate voltage sources 1 and 2 and an electric circuit 3 to connect them such that they provide a sufficient voltage to overcome any losses due to the resistance in the brake lines 4, thereby enabling the truck and trailer brakes 5 to provide the maximum possible braking. In response to a brake activation signal which occurs when a brake pedal is depressed or a hand brake is activated, the electric circuit 3 connects voltage sources 1 and 2 in a series configuration and connects them to each brake 5 through brake lines 4. Additionally, electric circuit 3 can activate the brake lights on the trailer or towed vehicle when the brakes are activated. The electric circuit 3 can also connect the voltage sources 1 and 2 in parallel to charge them when the braking system is not activated.

Figure 2:
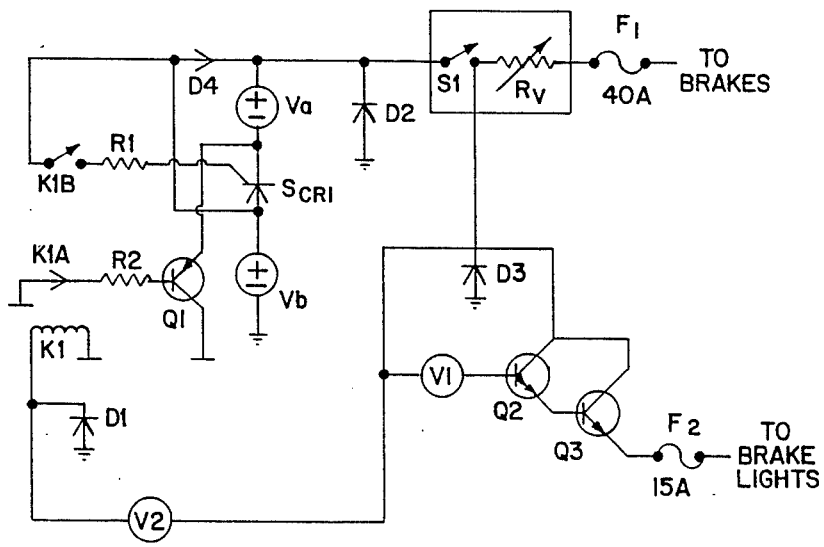
FIG. 2 is a circuit diagram of a preferred embodiment of the braking system shown in FIG. 1.

FIG. 2 shows a circuit diagram of a preferred embodiment of the electric circuit 3 used in the electric braking system of the present invention. When the braking system is not activated, but is in the standby mode, transistor Q1 is forward biased thereby connecting the auxiliary battery Va in parallel with the truck battery Vb. This enables the truck battery Vb to charge the auxiliary battery Va through diode D4. When the braking system is activated by closing switch S1, V2 and V1 are energized. V1 drives high current amplifier pair Q2 and Q3 which provides the power to activate the trailer stoplights. V2 activates a relay coil which opens a switch K1A feeding current to the base of transistor Q1 thereby turning off Q1. The relay coil also closes switch K1B which turns on SCR1, thereby connecting the auxiliary battery Va and the truck battery Vb in series with the electric brakes.

Diodes D1, D2 and D3 provide transient line protection while fuses F1 and F2 prevent too much current from being provided to the trailer brakes and the trailer brake lights, respectively. When the brake activation signal ceases, the braking system reverts to the standby configuration. Some of the other components used in the embodiment shown in FIG. 2 are R1=22 $\Omega$, 1/2 W; R2=10 $\Omega$ 50 W; D1=D2=D3=Ecg 125; SCR1=5568; V1=Ecg 968; V2=Ecg 966; D4=Ecg 6065; F1=40 A; F2=15 A; Q1=Ecg 30; Q2=Ecg 243; Q3=Ecg 181; K1=Double pole, double through 12 V relay.

In the system shown in FIG. 2, the truck battery Vb is typically a 12-volt battery which is located in the engine compartment. The auxiliary battery Va is also preferably a 12-volt battery which can be located either in the engine compartment or in any other convenient location on the truck or trailer. While 12-volt batteries are preferred because they are standard items and easily available, it would be evident to one skilled in the art that batteries of other voltages could be used so long as sufficient voltage was applied to the brake lines to overcome the resistance therein and provide a sufficient voltage at the electric brakes to provide the maximum braking. The combined voltage of the batteries Va and Vb should be greater than the operating voltage of the electric brakes plus the loss in voltage due to the resistance in the brake lines. Typically, electric brakes require 12 volts to operate properly. It has been found that the voltage loss in the brake lines is typically between 3 and 6 volts. Thus, the combined voltage of voltage sources 1 and 2 should be greater than 18 volts.

Figure 3:
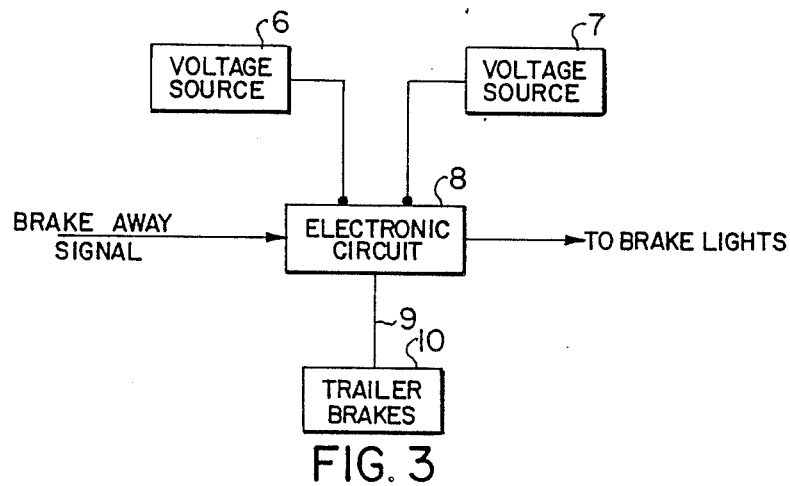
FIG. 3 is a block diagram of the break-away braking system of the present invention.

The break-away braking system shown in FIG. 3 is similar to the braking system shown in FIG. 1. Preferably, the present invention uses two separate voltage sources 6 and 7 and an electronic circuit 8 to connect them such that during a break-away condition they provide a sufficient voltage to overcome any losses due to the resistance in the trailer brake lines 9 thereby enabling the trailer brakes 10 to provide the maximum possible braking. In response to a break-away activation signal which occurs when the trailer is separated from the truck cab, the electronic circuit 8 connects voltage sources 6 and 7 in a series configuration and connects them to each trailer brake 10 through trailer brake lines 9. The electronic circuit 8 can also connect the voltage sources 6 and 7 in parallel with each other and with another power supply such as the truck battery to charge them when necessary.

Figure 4:
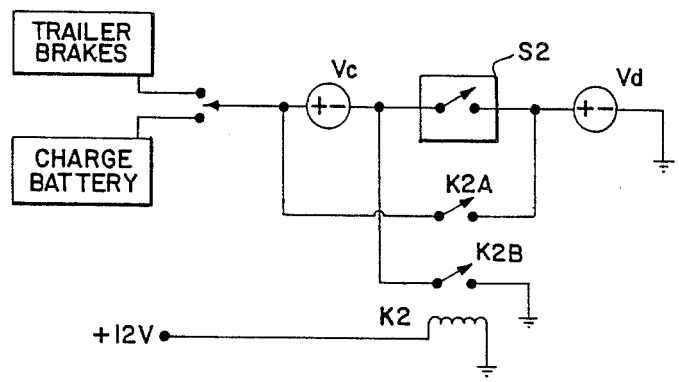
FIG. 4 is a circuit diagram of a preferred embodiment of the break-away braking system shown in FIG. 3.

FIG. 4 shows a preferred embodiment of the electronic circuit 8 used in the break-away braking system of the present invention. The break-away braking system cannot utilize the truck battery as one of the voltage sources since both voltage sources must be located on the trailer if they are to activate the trailer brakes should the truck cab become separated from the trailer. The break-away braking system shown in FIG. 4 has three modes of operation. In the charge mode of operation, break-away switch S2 is open and switches K2A and K2B are closed, putting the two batteries Vc and Vd in parallel. Preferably Vc and Vd are both 12-volt batteries. When batteries Va and Vd are charged and the truck is ready for a trip, the electronic circuit 8 switches the break-away braking system from the charging mode to the standby mode. This is accomplished by opening switches K2A and K2B, thereby disconnecting batteries Vc and Vd from their parallel configuration. In this configuration, the break-away braking system is ready to be activated as soon as the break-away switch S2 is closed. When break-away switch S2 is activated due to a break-away of the trailer from the truck, batteries Vc and Vd are connected in series with each other and immediately provide 24 volts to the electric brakes through the cables.

While a presently preferred embodiment of practicing the invention has been shown and described with particularity in connection with the accompanying drawings, the invention may otherwise be embodied within the scope of the following claims.

What is claimed is:

1. In an electric braking system for a vehicle comprising a plurality of electric brakes and a plurality of brake cables connected thereto, the improvement comprising a first voltage source which supplies electrical power to other systems in the vehicle at a fixed voltage, and an electric circuit connected thereto such that when the electric brakes are to be activated, the electric circuit connects a second voltage source in series with the first voltage source and connects both the first and the second voltage sources to each brake cable in a series configuration to provide a sufficient current at a sufficient voltage to operate the electric brakes.

2. The electric braking system as described in claim 1 wherein the voltage sources are batteries.

3. The electric braking system as described in claim 2 wherein the batteries comprise a truck battery and an auxiliary battery.

4. The electric braking system as described in claim 3 wherein the batteries when connected in series have a voltage greater than 18 volts.

5. The electric braking system as described in claim 3 wherein the batteries have a voltage of 12 volts.

6. In an electric braking system for a vehicle comprising a plurality of electric brakes and a plurality of brake cables connected thereto, the improvement comprising a plurality of voltage sources and an electric circuit connected thereto such that: (1) when the electric brakes are to be activated, the electric circuit connects the plurality of voltage sources to each brake cable in a series configuration to provide a sufficient current at a sufficient voltage to operate the electric brakes; and (2) when the electric brakes are not activated, the electric circuit connects the plurality of voltage sources to each other in a parallel configuration such that one voltage source charges the other voltage sources.

7. The electric braking system as described in claim 6 wherein the voltage sources comprise a truck battery and an auxiliary battery and the truck battery charges the auxiliary battery when the electric brakes are not activated.

8. The electric braking system as described in claim 7 wherein the voltage sources are batteries.

9. The electric system as described in claim 8 wherein the batteries comprise a truck battery and an auxiliary battery.

10. The electric braking system as described in claim 9 wherein the batteries when connected in series have a voltage greater than 18 volts.

11. The electric braking system as described in claim 9 wherein the batteries have a voltage of 12 volts.

12. In an electric break-away braking system for a towed vehicle comprising a plurality of electric brakes and a plurality of brake cables connected thereto, the improvement comprising a plurality of batteries located on the towed vehicle and an electronic circuit connected thereto such that when the electric brakes are to be activated, the electronic circuit can also connect the plurality of batteries in series and to each brake cable to provide a sufficient current at a sufficient voltage to operate the electric brakes, and wherein the electronic circuit connects the batteries in a parallel configuration with each other and in series with a power supply which is used to charge the batteries.

13. The electric break-away braking system as described in claim 12 wherein the batteries on the towed vehicle when connected in series have a voltage greater than 18 volts.

14. The electric break-away braking system as described in claim 2 wherein the batteries on the towed vehicle have a voltage of 12 volts.

15. The electric break-away braking system as described in claim 12 wherein the power supply is a truck battery.

* * * * *